Patented Dec. 17, 1940

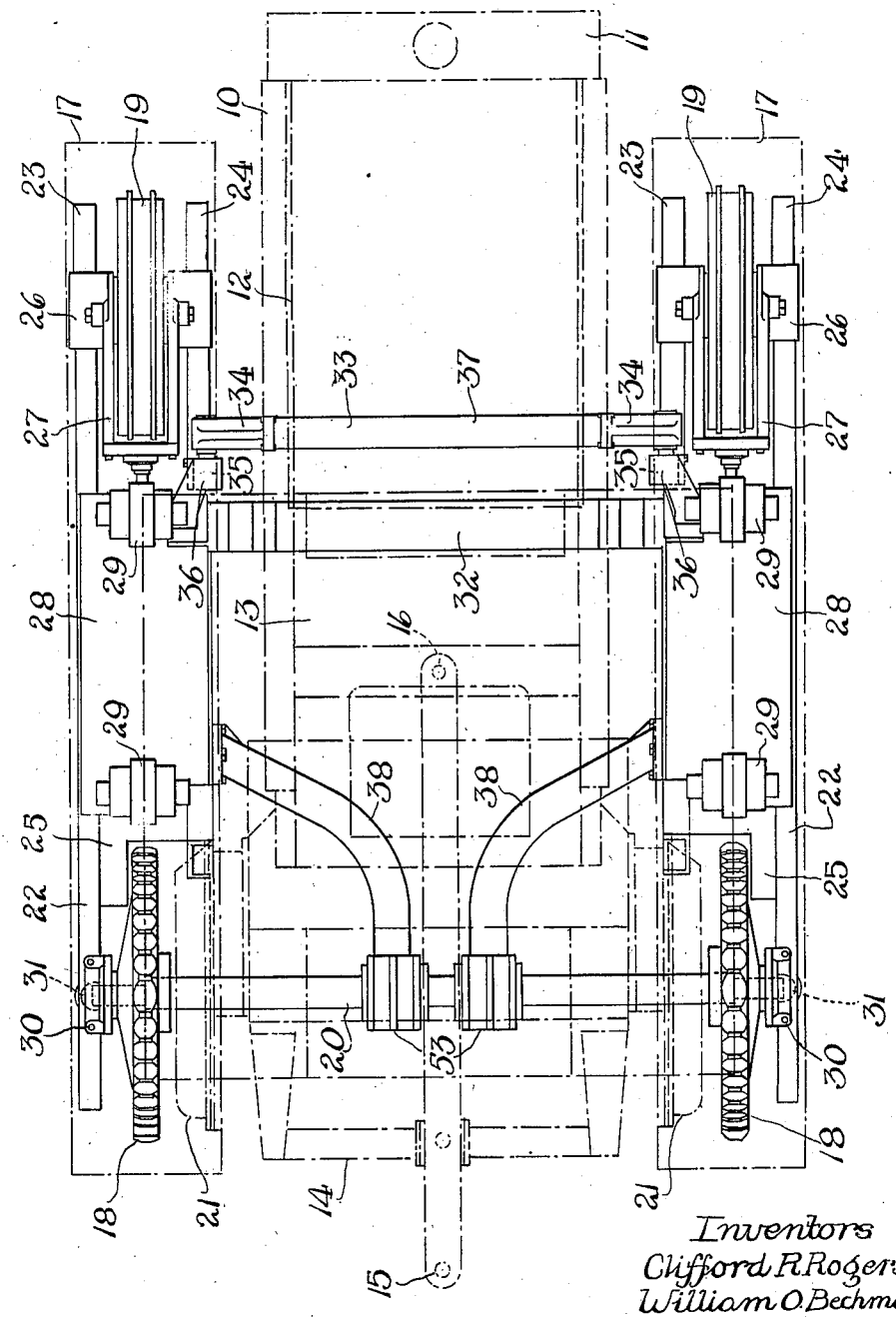

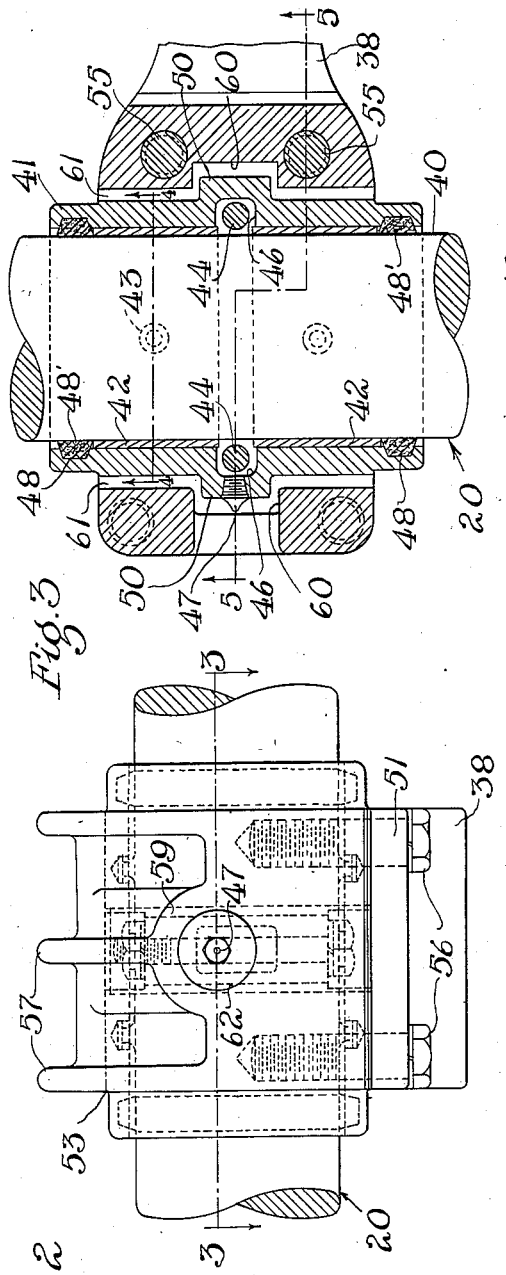
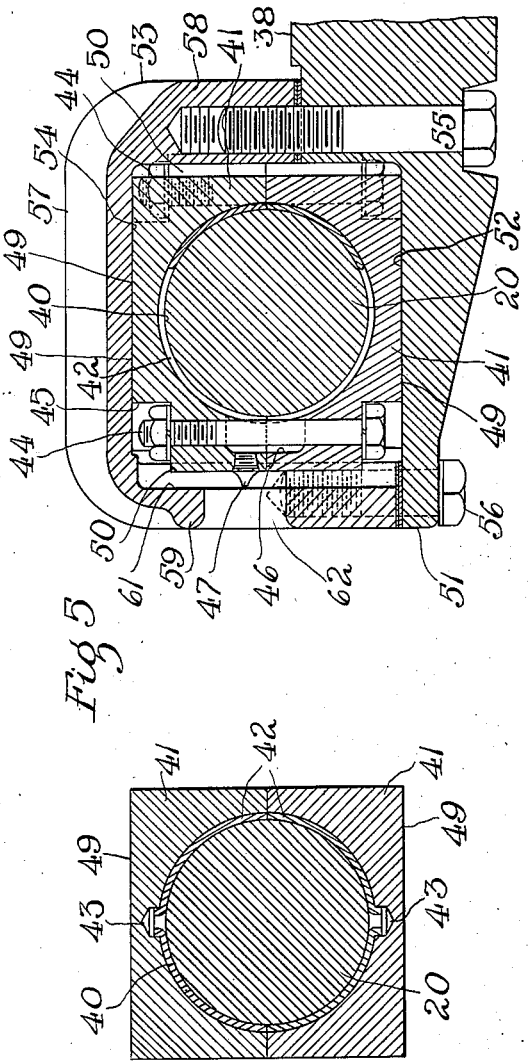

2,225,233

UNITED STATES PATENT OFFICE 2,225,233

BEARING CONSTRUCTION FOR TRACK-TYPE TRACTORS

Clifford R. Rogers, Oak Park, and William O. Bechman, Chicago, Ill., assignors to International Harvester Company, a corporation of New Jersey Application June 25, 1938, Serial No. 215,917

9 Claims. (Cl. 308—15)

This invention relates to a bearing construction for mounting a member on a support, and is especially adapted for use in a tractor of the track laying type.

General design of a tractor of the track laying type includes a main body carried on a pair of opposite self-laying tracks. Each track envelops a track frame construction which is carried by the main body for vertical movement with respect thereto about a transverse axis located at the rear of the tractor. The forward portion of the body is carried on the track frame structures through the medium of a transverse equalizer, in most cases in the form of a leaf spring. This construction permits vertical oscillation of the track frames without unduly twisting the main body as the tractor is operated over uneven ground. Because of the relative movement permitted between the tracks and the main body, it is important that these structures be adequately braced to prevent damage thereto, especially when steering the tractor or operating the same in connection with a bulldozer or the like. Preferable constructions are provided with a main transverse support in the form of a shaft or axle disposed at the rear of the tractor. Each outer end of the shaft is provided with a bracket structure pivotally, and, in some cases, universally carried thereon. Each track frame structure is rigidly carried by each bracket structure for pivotal or universal movement about the axis of the transverse shaft or axle. In order to prevent undue twisting, toeing-in, or spreading out of the track frame structures, various types of brace members are utilized, and, in larger types of tractors, the use of stabilizers at the forward end of the tractor is also resorted to. A preferable type of brace member is that which is rigidly secured to a track frame structure and extends rearwardly and inwardly therefrom to a point where it is pivotally carried by the transverse shaft or axle. Since there will be slight undesirable movement of the track frames regardless of the precaution taken, it is important that the points of connection between the transverse shaft and the brace members permit not only pivotal movement, but also slidable movement, between the shaft and each member. This provision prevents destruction of the bearings on the shaft and undue strains on the shaft itself.

The principal object of the present invention is to provide an improved bearing construction for mounting the brace member on the transverse shaft or axle in a manner permitting both pivotal and slidable movement of the member with respect to the shaft as different strains are applied to a track frame.

An important object is to provide the bearing member in a manner permitting free limited movement of the brace member with respect to the shaft or axle.

Another object is to provide a bearing member formed with bearing surfaces adapted to cooperate with the shaft for movement of the member with respect thereto and to provide the bearing member with additional bearing surfaces adapted to cooperate with bearing surfaces formed on the brace member for permitting relative movement between the bearing and the member.

Another object is to provide lubricating means for the bearing surface between the bearing and the shaft.

Still another object is to provide a brace member and the bearing member with engaging portions for limiting relative movement therebetween.

Still another object is to provide a bearing construction sealed against the escape of lubricant and the entrance of dirt, dust, etc.

And, still another object is to provide these interengaging portions in a manner limiting relative movement between the brace member and the bearing member in at least two directions.

Briefly and specifically, these and other desirable objects of the invention may be achieved by one preferred form of the invention wherein the tractor is provided with a transverse shaft or axle having a cylindrical surface, about which are fitted two complementary bearing halves secured together and each provided with a substantially semi-cylindrical surface cooperating with the cylindrical surface of the shaft or axle. Each bearing half is provided at its outer face with a substantially flat bearing surface, these two surfaces, when the bearing halves are secured in position about the shaft, being in oppositely disposed relation. In this manner, the two bearing halves are permitted to have pivotal movement as a unit about the shaft. The rear end of the brace member of the tractor is formed with a bifurcated portion which embraces the unitary bearing and has inner flat bearing surfaces cooperating with the flat bearing surfaces on the bearing. The bifurcated portion and the bearing are provided with inter-engaging portions for limiting relative movement between the bearing and the member. In this manner, the brace member is permitted to have relative sliding movement with respect to the bearing and relative pivotal movement with the bearing with respect to the shaft. Means is also provided for lubricating the cylindrical bearing surface.

A further understanding of the objects of the invention may be had from the following detailed description taken in conjunction with the accompanying sheets of drawings, wherein:

Figure 1 is a plan view illustrating diagrammatically the general construction of a tractor of the track laying type and embodying the invention;

Figure 2 is an enlarged rear elevational view of the improved bearing and mounting construction;

Figure 3 is a horizontal sectional view taken on the line 3—3 of Figure 2, showing the relation between the shaft, the bearing, and the brace member;

Figure 4 is a vertical sectional view taken on the line 4—4 of Figure 3, showing the manner in which a bushing is provided between the shaft and the bearing; and, Figure 5 is a vertical sectional view taken on the line 5—5 of Figure 3, showing the relation between the various parts and also the means for lubricating the bearing surface.

The track type tractor chosen for purposes of illustration embodies a more or less conventional construction and has, therefore, been illustrated diagrammatically, as in Figure 1. The tractor comprises a main body portion 10 provided at its forward end with a radiator 11, behind which is disposed a rearwardly extending engine hood 12 terminating at its rearward end adjacent an operator's deck 13. A draw-bar construction 14 is carried at the rear of the main body and includes a longitudinally extending draw-bar 15 pivoted about a vertical axis at its forward end, as at 16, on an under portion of the main body 10.

Two track mechanisms 17 are longitudinally disposed alongside the main body 10, one at each side. Each track mechanism includes a self-laying track which envelops a drive sprocket wheel 18 and a front idler wheel 19, all of which is more or less conventional. The rear sprocket wheels 18 are disposed for rotation adjacent the outer ends of a support in the form of a shaft or axle 20 and are driven by drive gearing, not shown, contained in drive gearing housings 21 located at each side of the rear portion of the main body. Further included in each track mechanism is a track frame structure 22 preferably comprising a pair of spaced side members 23 and 24 secured together in spaced relation by an upper horizontal plate member 25. This plate member 25 terminates short of the forward ends of the side members 23 and 24 and provides a bifurcated portion in the track frame structure between which the front idler wheel is carried. The idler wheel is carried for rotation by a pair of blocks 26 slidably carried by the side members 23 and 24. These blocks are connected by a rearwardly extending yoke 27, which cooperates with the usual track recoil spring mechanism, not shown, enclosed in a housing 28. At opposite ends of the housing 28, each track frame structure carries a pair of track rollers 29, which support the upper run of the self-laying track.

It will be noted that the outer side frame member 24 of the track frame structure 22 extends rearwardly alongside the sprocket wheel 18 and rigidly carries a bracket structure 30. Each track frame structure 22 is movably carried by the transverse shaft or axle 20 through the medium of the respective bracket structure 30. Each bracket structure 30 cooperates with a respective ball joint structure 31 at an outer end of the shaft, and each track frame structure thereby has universal movement with respect to the support 20, the support 20 being preferably rigidly carried by the main body 10.

As is conventional in the construction of most tractors of the track-laying type, the forward portion of the main body 10 is supported on the opposite track frame structures through the medium of a transverse equalizer spring 32. This construction permits vertical oscillation of the track frame structures with respect to the main body. In order to brace the forward portions of the track frame structure against relative inward or outward movement, a stabilizing means 33 has been provided and includes a pair of brackets 34, one at each side of the main body. Each bracket extends downwardly and outwardly and is provided with a roller 35, which cooperates with a vertical guideway formed in a bracket 36 rigidly carried by a track frame structure 22. These brackets 34 are strengthened by a transverse brace member 37 secured to each and extending below the main body 10. The construction so far described is generally that disclosed in the patent to Johnston 2,135,619, granted November 8, 1938.

From the foregoing description it will be seen that each track frame structure is permitted to move in a substantially vertical plane about the axis of the transverse shaft or axle 20. This movement is limited vertically with respect to the main body by the provision of the stabilizing means 33. This means further limits somewhat the relative inward and outward movement of the track frames. However, since the aforesaid connection 30, 31 between the outer end of the shaft or axle 20 of the track frame structure is of the universal type, it is desirable to provide means for preventing undue twisting of the track frame structure about a longitudinal axis. This means is in the form of a torque brace or member 38, which is rigidly secured at its forward and outer end to a track frame structure. Each member 38 extends diagonally rearwardly and inwardly and has its rear portion associated with the transverse shaft or axle 20, as best illustrated in Figure 1. As previously mentioned, it is desirable that the connection between each brace member and the shaft or axle 20 permits some relative movement for the purpose of avoiding destruction of the ball joints 31 and bracket structures 30. Because of irregularities in manufacture, a certain amount of undesirable movement of each track frame will be had, regardless of the stabilizer means 33 and the torque braces 38. Therefore, it is desirable that this movement be controlled as much as possible to prevent damage to the shaft 20 through undue strains needlessly applied thereto. For these reasons, then, it is desirable to provide a construction permitting controlled relative movement between the rear ends of the brace members 38 and the transverse shaft or axle 20.

A preferable construction for this purpose is that illustrated in the one embodiment of the invention as herein disclosed and illustrated. Since both bearing and mounting constructions for the torque braces or members 38 are similar, only one will be described, it being understood that similar parts are located in similar positions in the other element.

The shaft or axle 20 is provided with a cylindrical bearing surface 40. A pair of complementary bearing halves 41 are secured together about the shaft 20. Each bearing half is provided with a substantially semicylindrical bearing surface, which, in the present instance, is faced by one-half of a bushing 42. Each bushing, as best shown in Figure 4, is fitted into each bearing half 41, as at 43, for preventing relative movement between the two. It will be noted that each bearing half substantially surrounds one-half of the cylindrical surface of the shaft or axle 20. These two halves are secured together by means of a pair of bolts 44 passed therethrough, the outer portion of each half 41 being recessed, as at 45, for permitting a preferable disposition of a nut and a head of the bolt. Each bearing half is provided with a recess 46 open at its inner side to the aforesaid cylindrical bearing surface. A lubricant fitting 47 is fitted into one bearing half and communicates with the recess for supplying lubricant thereto, which lubricant is spread over the cylindrical bearing surface. It will be noted from an examination of Figure 3 that the bushing parts 42 terminate at their inner ends in spaced relation, the space provided therebetween being alined with the lubricant recesses 46. In this manner, proper lubrication of the cylindrical bearing surface is assured.

Since the bearing halves are secured together about and substantially completely surround the shaft or axle 20, it will be seen that they are permitted to have pivotal movement as a unit about the cylindrical bearing surface 40 on the shaft. Each bearing half 41 extends in a direction axially of the shaft or axle 20 and at each end is provided with a portion 48 associated with a corresponding portion on the other half, which portions completely surround the shaft 20. Each surrounding portion is provided with a lubricant and dust seal 48' for preventing the escape of lubricant from, and the entrance of dirt to, the cylindrical bearing surface.

Each bearing half 41 is provided with an outer, substantially flat bearing surface 49, which surfaces, when the bearing halves are secured together on the shaft, are in oppositely disposed, horizontal relationship. It will be seen from an examination of Figure 5 that these surfaces 49 are disposed farther outwardly than the recessed portions 45, previously described in connection with the means or bolts 44 for securing the halves together. It will be also seen that these bolts are disposed substantially centrally of the bearing, whereat each half is also provided with a pair of horizontally spaced, vertically extending ribs 50. These ribs are disposed at right angles to the axis of the shaft 20 and a portion of each is provided on each bearing half, the two portions of each rib, when the bearing halves are secured together, being substantially coextensive, and thus each pair of ribs may be spoken of as one. The purpose of these ribs will be described in connection with the following description of the rear end portion of the brace member 38.

Each brace member 38 is provided at its rear end with a bifurcated portion which embraces the bearing. A preferable form of bifurcated portion, as illustrated, is provided by a rearwardly extending furcation or portion 51 formed integral with the brace member 38. This furcation is provided with an inner, substantially flat bearing surface 52, which slidably cooperates with the bearing surface 49 on the lower bearing half 41. A cap member 53 forms the other furcation of the end portion of the brace 38 and is provided with an inner, substantially flat bearing surface 54, which slidably cooperates with the bearing surface 49 of the upper bearing half 41. This cap 53 substantially embraces the entire bearing assembly and is secured at its forward end to the brace member 38 by a pair of bolts 55 and at its rear end by a pair of bolts 56. This cap is provided with a plurality of strengthening ribs 57, and at its forward and rear portions is substantially thickened, as at 58 and 59, respectively. Each portion 58 and 59 is provided with a vertical groove 60, which, as best shown in Figure 3, loosely fits the ribs 50 on the bearing. It will be noted also that the inner face of each portion 58 and 59 is spaced somewhat from the forward and rearward portions, respectively, of the bearing, as at 61. This provision permits limited relative sliding movement between the brace member 38 and the bearing assembly, and, since the brace member is associated with the bearing, it has pivotal movement therewith about the axis of the shaft or axle 20. It will be further noted that each rib 50 extends slightly into each groove 60 in the bearing member for limiting relative movement between the brace member and the bearing in a direction axially of the shaft 20. Since the member 38 is rigidly carried by the track frame structure 22, it will thus be seen that axial displacement of the bearing with respect to the member is prevented by the inter-engagement of the portions or ribs 50 with the grooves 60. The rear portion 58 of the cap member 53 is provided with an opening 62 substantially coincident with the aforesaid lubricant fitting 47, being somewhat larger than the fitting. Access to the fitting is provided through the opening 62, the opening being sufficiently large to permit relative movement between the parts without damaging the fitting. A further advantage of this recessed location of the fitting is that damage to it is prevented from other sources.

From the foregoing description it will be seen that, as the tractor operates over uneven ground, the track frames are permitted to have free vertical movement with respect to the main body, limited only by the stabilizing means 33. As previously mentioned, the stabilizing means also limits somewhat the relative transverse movement between the track frame structures and with respect to the main body. The provision of the torque braces or members 38 prevents undue twisting of the track frame structures about longitudinal axes passed through the universal connections 30, 31. Since there will be some toeing-in or spreading out of the track frame structures, it is important that this movement be limited or controlled in a desirable manner, this being accomplished by the improved bearing construction provided by the invention. Fore and aft movement of the brace members 38, as the track frame structure toes in or spreads out, is permitted within the limited spaces between the bearings and the members, as at 61. This provision assures increased life of related parts of the tractor construction, principally of the shaft and ball joints 30. These advantages, in addition to others, have been embodied in one preferred construction, as illustrated and described, but it will be readily seen that numerous alterations and modifications of that construction may be made without departing from the spirit and scope of the invention as defined in the appended claims.

What is claimed is:
1. In combination, a support having a cylindrical bearing surface, a bearing member carried thereon for pivotal movement about said surface and comprising two complementary halves each formed with an inner, substantially semicylindrical bearing surface cooperating with the support bearing surface, each bearing surface including a groove therein formed about the axis about which the surface is generated, said bearing halves being secured together and extending axially along the support having opposite end portions surrounding the cylindrical surface of the support, the grooves in each surface combining to form a circular groove, a circular lubricant seal arranged in said groove, each bearing half further being formed with an outer substantially flat bearing surface, said flat surfaces when the halves are secured together being arranged at opposite sides of the bearing, and a member including a bifurcated end portion embracing the bearing, each furcation including an inner flat bearing surface slidably cooperating with a flat surface of the bearing, said bifurcated portion of the member further being formed with abutments adapted to engage portions of the bearing for limiting relative sliding movement between the member and the bearing.

2. In combination, a support having a cylindrical bearing surface, a bearing member carried thereon for movement axially along and pivotally about said surface and comprising two complementary halves each formed with a semicylindrical bearing surface cooperating with the support bearing surface, said bearing halves being secured together and extending axially along the support having opposite end portions surrounding the cylindrical surface of the support and provided with lubricant seals, each bearing half further being formed with an outer, substantially flat bearing surface, said flat surfaces when the halves are secured together being arranged at opposite sides of the bearing, and a member including a bifurcated end portion embracing the bearing, each furcation including an inner flat bearing surface slidably cooperating with a flat surface of the bearing, said bifurcated portion of the member being formed with abutments adapted to engage portions of the bearing for limiting relative sliding movement between the member and the bearing, said bifurcated portion being further formed with portions engaging the bearing for limiting relative sliding movement between the bearing and the member in a direction axially of the support.

3. In combination, a support having a cylindrical surface, a bearing member carried thereon for pivotal movement about said surface and comprising two complementary halves each formed with an inner, substantially semicylindrical bearing surface cooperating with the surface of the support, one of said halves being formed with a recess open to its bearing surface and including a lubricant fitting communicating with the recess, said halves being secured together and extending axially along the support having opposite end portions surrounding the cylindrical surface of the support and provided with lubricant seals, each bearing half further being formed with an outer, substantially flat bearing surface, said flat surfaces when the halves are secured together being arranged at opposite sides of the bearing, and a member including a bifurcated end portion embracing the bearing, each furcation including an inner flat bearing surface slidably cooperating with a flat surface of the bearing, said bifurcated portion of the member further being formed with abutments adapted to engage portions of the bearing for limiting relative sliding movement between the member and the bearing.

4. In combination, a support having a cylindrical surface, a bearing member carried thereon for pivotal movement about said surface and comprising two complementary halves each formed with an inner substantially semicylindrical bearing surface cooperating with the surface of the support, one of said halves being formed with a recess open to its bearing surface and including a lubricant fitting communicating with the recess, said halves being secured together and extending axially along the support having opposite end portions surrounding the cylindrical surface of the support and provided with lubricant seals, each bearing half further being formed with an outer, substantially flat bearing surface, said flat surfaces when the halves are secured together being arranged at opposite sides of the bearing, and a member including a bifurcated end portion embracing the bearing, each furcation including an inner flat bearing surface slidably cooperating with a flat surface of the bearing, said bifurcated portion of the member further being formed with abutments adapted to engage portions of the bearing for limiting relative sliding movement between the member and the bearing, one furcation of the member being formed with an opening coincident with the aforesaid lubricant fitting.

5. In combination, a support having a cylindrical bearing surface, a bearing member carried thereon for movement axially along and pivotally about said surface and comprising two complementary halves, each formed with an inner, substantially semicylindrical bearing surface cooperating with the support bearing surface, said bearing halves being secured together and each being formed with an outer, substantially flat bearing surface, said flat surfaces when the halves are secured together being arranged at opposite sides of the bearing, one of said halves being provided with a substantially central rib extending in a plane substantially at right angles to the axis of the inner bearing surface, and a member including a bifurcated end portion embracing the bearing, each furcation including an inner, flat bearing surface slidably cooperating with a flat surface of the bearing, one furcation being further formed with a groove adapted to coact with the aforesaid rib on the bearing half for limiting relative sliding movement between the bearing and the member in a direction axially of the support.

6. In combination, a support having a cylindrical bearing surface, a bearing member carried thereon for movement axially along and pivotally about said surface and comprising two complementary halves, each formed with an inner, substantially semicylindrical bearing surface cooperating with the support bearing surface, said bearing halves being secured together and each being formed with an outer substantially flat bearing surface, said flat surfaces when the halves are secured together being arranged at opposite sides of the bearing, one of said halves being provided with a rib extending in a plane substantially at right angles to the axis of its inner bearing surface, said half being further formed at its inner side with a recess open to its inner bearing surface, a lubricant fitting carried by said half and communicating with said recess, and a member including a bifurcated end portion embracing the bearing, each furcation including an inner flat bearing surface slidably cooperating with a flat surface of the bearing, one of said furcations being formed with a groove adapted to coact with the aforesaid rib on the bearing for limiting relative sliding movement between the bearing and the member in a direction axially of the support.

7. A bearing for mounting a member on a cylindrical support comprising a pair of complementary bearing parts secured together around the support and having inner substantially semicylindrical bearing surfaces cooperating with the cylindrical surface of the support, one of said parts being formed with a recess open to the bearing surface, a lubricant fitting carried by the recessed bearing part and communicating with the recess, said fitting extending outwardly from the bearing part, each of said bearing parts including a flat outer bearing surface, said surfaces being arranged substantially parallel, the member having a bifurcated portion embracing the bearing parts, each furcation being formed with an inner flat bearing surface slidably cooperating with a respective flat surface on the bearing parts, said furcations being interconnected by a portion extending adjacent the aforesaid lubricant fitting, said portion being formed with an opening coincident with said fitting, said portion in the vicinity of said opening being of a thickness greater than the outward extent of the lubricant fitting from the bearing part.

8. In combination, a support having a cylindrical bearing surface, a pair of bushings surrounding said cylindrical surface and having their inner ends axially spaced, a bearing member completely surrounding said bushings, each bushing and the bearing member having interengaging portions for mounting each bushing for movement with the bearing member about the support and for preventing relative axial movement between the bushings, said bearing member being further formed with a recess in alinement with the space between the inner ends of the bushings, a lubricant fitting carried by the bearing member and communicating with the recess, and a brace member carried by the bearing member for sliding movement with respect thereto, said brace member substantially completely embracing the bearing member and including a portion formed with an opening substantially coincident with the lubricant fitting.

9. In combination, a support having a cylindrical bearing surface, a bearing member carried thereon for movement axially along and pivotally about said surface and comprising two complementary halves, each formed with an inner, substantially semicylindrical bearing surface cooperating with the support bearing surface, said bearing halves being secured together and each being formed with an outer substantially flat bearing surface, said flat surfaces when the halves are secured together being arranged at opposite sides of the bearing, one of said halves being provided with a rib extending in a plane substantially at right angles to the axis of its inner bearing surface, said half being further formed at its inner side with a recess in alinement with the rib and open to its inner bearing surface, a lubricant fitting carried by said half in the rib and communicating with said recess, and a member including a bifurcated end portion embracing the bearing, each furcation including an inner flat bearing surface slidably cooperating with a flat surface of the bearing, one of said furcations being formed with a groove adapted to coact with the aforesaid rib on the bearing for limiting relative sliding movement between the bearing and the member in a direction axially of the support, said furcation having an opening therethrough in alinement with the groove and coincident with the lubricant fitting.

CLIFFORD R. ROGERS.
WILLIAM O. BECHMAN.